United States Patent
Andre et al.

(10) Patent No.: US 10,444,830 B2
(45) Date of Patent: Oct. 15, 2019

(54) HEAD-MOUNTED DISPLAY SYSTEM COMPRISING HEADING SELECTION MEANS AND ASSOCIATED SELECTION METHOD

(71) Applicant: THALES, Courbevoie (FR)

(72) Inventors: Cecile Andre, Bordeaux (FR); Xavier Servantie, Pessac (FR); Laurent Laluque, Bordeaux (FR); Francois Michel, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/305,651

(22) PCT Filed: Apr. 27, 2015

(86) PCT No.: PCT/EP2015/059005
§ 371 (c)(1),
(2) Date: Oct. 20, 2016

(87) PCT Pub. No.: WO2015/165837
PCT Pub. Date: Nov. 5, 2015

(65) Prior Publication Data
US 2017/0038833 A1    Feb. 9, 2017

(30) Foreign Application Priority Data
Apr. 30, 2014  (FR) ..................... 14 01005

(51) Int. Cl.
*G06F 3/01* (2006.01)
*G01C 23/00* (2006.01)
(Continued)

(52) U.S. Cl.
CPC ........... *G06F 3/012* (2013.01); *G01C 23/005* (2013.01); *G02B 27/0093* (2013.01);
(Continued)

(58) Field of Classification Search
CPC .... G01C 23/00; G01C 23/005; G08G 5/0021; G08G 5/025; G09G 2380/12;
(Continued)

(56) References Cited

U.S. PATENT DOCUMENTS 6,255,965 B1   7/2001   D'Orso
8,907,887 B2 * 12/2014   Larson ................... G02B 27/01
345/156

(Continued)

FOREIGN PATENT DOCUMENTS

EP       2 254 105 A2   11/2010

OTHER PUBLICATIONS

PCT International Search Report for PCT Counterpart Application No. PCT/EP2015/059005, 5 pp. (Including English translation), (dated Jun. 30, 2015).

(Continued)

*Primary Examiner* — Koosha Sharifi-Tafreshi
(74) *Attorney, Agent, or Firm* — Womble Bond Dickinson (US) LLP

(57) ABSTRACT

The general field of the invention is that of head viewing systems for aircraft comprising a head support, a viewing device, a detection of posture of said head support, means for detecting the current heading of an aircraft and means for graphically generating said heading. The system according to the invention comprises means of control, display and selection of headings arranged so as:
to display, in response to a first command, a second so-called setpoint heading and a third heading termed a "support heading" corresponding to the direction of the head support in a terrestrial reference frame, said direction given by the information arising from the detection of posture of said head support and the means for detecting the current heading;

(Continued)

to replace, in response to a second command, said second heading by said third heading, said third heading thus becoming the new heading setpoint.

6 Claims, 3 Drawing Sheets

(51) Int. Cl.
*G02B 27/01* (2006.01)
*G02B 27/00* (2006.01)
*G06T 7/70* (2017.01)
*F41G 3/22* (2006.01)
*G06F 3/0481* (2013.01)
*G06F 3/0484* (2013.01)

(52) U.S. Cl.
CPC ....... *G02B 27/017* (2013.01); *G02B 27/0179* (2013.01); *G06T 7/70* (2017.01); *F41G 3/225* (2013.01); *G02B 2027/014* (2013.01); *G02B 2027/0141* (2013.01); *G02B 2027/0187* (2013.01); *G06F 3/04817* (2013.01); *G06F 3/04842* (2013.01)

(58) Field of Classification Search
CPC ...... G05D 1/0676; G05D 1/00; G02B 27/017; G02B 27/0172; G02B 2027/0178; G02B 2027/0187; G02B 27/0176; G02B 27/0093; G06F 3/012; G06F 3/013
See application file for complete search history.

(56) References Cited

U.S. PATENT DOCUMENTS

| | | | |
|---|---|---|---|
| 2009/0112469 A1* | 4/2009 | Lapidot | G01C 23/00 701/469 |
| 2009/0224945 A1 | 9/2009 | Brehin et al. | |
| 2010/0131126 A1* | 5/2010 | He | G01C 21/00 701/14 |
| 2010/0156758 A1 | 6/2010 | Anders | |
| 2010/0295706 A1* | 11/2010 | Mathan | G01C 23/005 340/951 |

OTHER PUBLICATIONS

PCT Written Opinion of the International Searching Authority for PCT Counterpart Application No. PCT/EP2015/059005, 6 pp., (dated Jun. 30, 2015).

Office Action for counterpart EP Patent Appl. No. 15718233.8-1020, 6 pgs. (dated Jun. 18, 2018).

* cited by examiner

HEAD-MOUNTED DISPLAY SYSTEM COMPRISING HEADING SELECTION MEANS AND ASSOCIATED SELECTION METHOD

CROSS-REFERENCE TO RELATED APPLICATIONS

This patent application is a U.S. National Phase Application under 35 U.S.C. § 371 of International Application No. PCT/EP2015/059005, filed Apr. 27, 2015, entitled HEAD-MOUNTED DISPLAY SYSTEM COMPRISING HEADING SELECTION MEANS AND ASSOCIATED SELECTION METHOD, which claims priority to French Patent Application No. 1401005, filed Apr. 30, 2014.

FIELD

The field of the invention is that of viewing systems mounted on the head of the crew members of an aircraft. More precisely, the invention relates to the display and the selection of heading by this type of viewing system.

BACKGROUND

Helmet or head viewing systems have commonly been used for aeronautical applications for several decades. A head viewing system mainly comprises two sub-assemblies.

The first sub-assembly is a helmet or a headset equipped with a viewing system which projects a collimated image, superimposed on the exterior, toward the user's eye or eyes. Helmet is intended to mean a structure for protecting the head, said structure carrying a certain number of phone or viewing or detection devices. Headset is intended to mean a structure carrying a certain number of phone or viewing or detection devices and not necessarily ensuring a protection function for the head. The system according to the invention is equally a helmet or a head support.

The second sub-assembly is a head posture detection system making it possible to pinpoint in space, with respect to a known reference frame, generally tied to an aircraft, the position and the orientation of the helmet or of the headset. The main function of the viewing system is to be able to present, superimposed on the exterior landscape, so-called "conformal" information, that is to say displayed virtually in the exact direction that it would occupy in the exterior landscape. Thus, if the system displays a video image arising from a sensor and comprising a certain number of objects, the objects represented of this image are exactly superimposed with the objects present on the terrain. The same goes for synthetic representations of objects such as runways, targets or direction indications.

SUMMARY

Currently, when the crew wishes to follow a heading tied to an element of the exterior scene, they must firstly determine the heading associated with the exterior element and then input it into the avionics system, in general with the aid of a rotary knob mounted on a control post. The object of the invention is to simplify this operation by using the inherent resources of helmet or head viewing systems and in particular in displaying conformal information.

More precisely, the subject of the invention is a head viewing system for aircraft comprising a head support, a viewing device, a detection of posture of said head support, means for detecting the current heading of an aircraft and means for graphically generating said current heading, characterized in that the system comprises means for controlling, displaying and selecting headings, said means arranged so as:

to display, in the viewing device, in response to a first command, a second so-called setpoint heading and a third heading termed a "support heading" corresponding to the direction of the head support in a terrestrial reference frame, said direction given by the information arising from the detection of posture of said head support and the means for detecting the current heading;

to replace, in response to a second command, said second heading by said third heading, said third heading thus becoming the new heading setpoint.

Advantageously, when the headings lie in the viewing field of the viewing device, the display of the value of the heading is carried out in conformal position, that is to say in the exact direction which corresponds to the direction of the heading.

Advantageously, when the headings lie outside the viewing field of the viewing device, the display of the value of the heading is carried out at the edge of the field of the viewing device with an icon representative of the direction in which the heading lies.

Advantageously, the exact direction of the heading is indicated by a vertical bar, each heading comprising a bar of a different graphic from that of the other heading bars.

The invention also relates to a method of displaying, managing and selecting the heading in a head viewing system for aircraft, said viewing system comprising a head support, a viewing device, a detection of posture of said head support, means for detecting the current heading of an aircraft and means for graphically generating said current heading, characterized in that the method comprises at least:

a step of displaying, in response to a first command, a second so-called setpoint heading and a third heading termed a "support heading" corresponding to the direction of the head support in a terrestrial reference frame, said direction given by the information arising from the detection of posture of said head support and the means for detecting the current heading.

Advantageously, the method comprises:

a step of substituting, in response to a second command, the second heading by the third heading, said third heading thus becoming the new heading setpoint.

BRIEF DESCRIPTION OF THE DRAWINGS

The invention will be better understood and other advantages will become apparent on reading the nonlimiting description which follows and by virtue of the appended figures among which.

DETAILED DESCRIPTION

Figure 5:
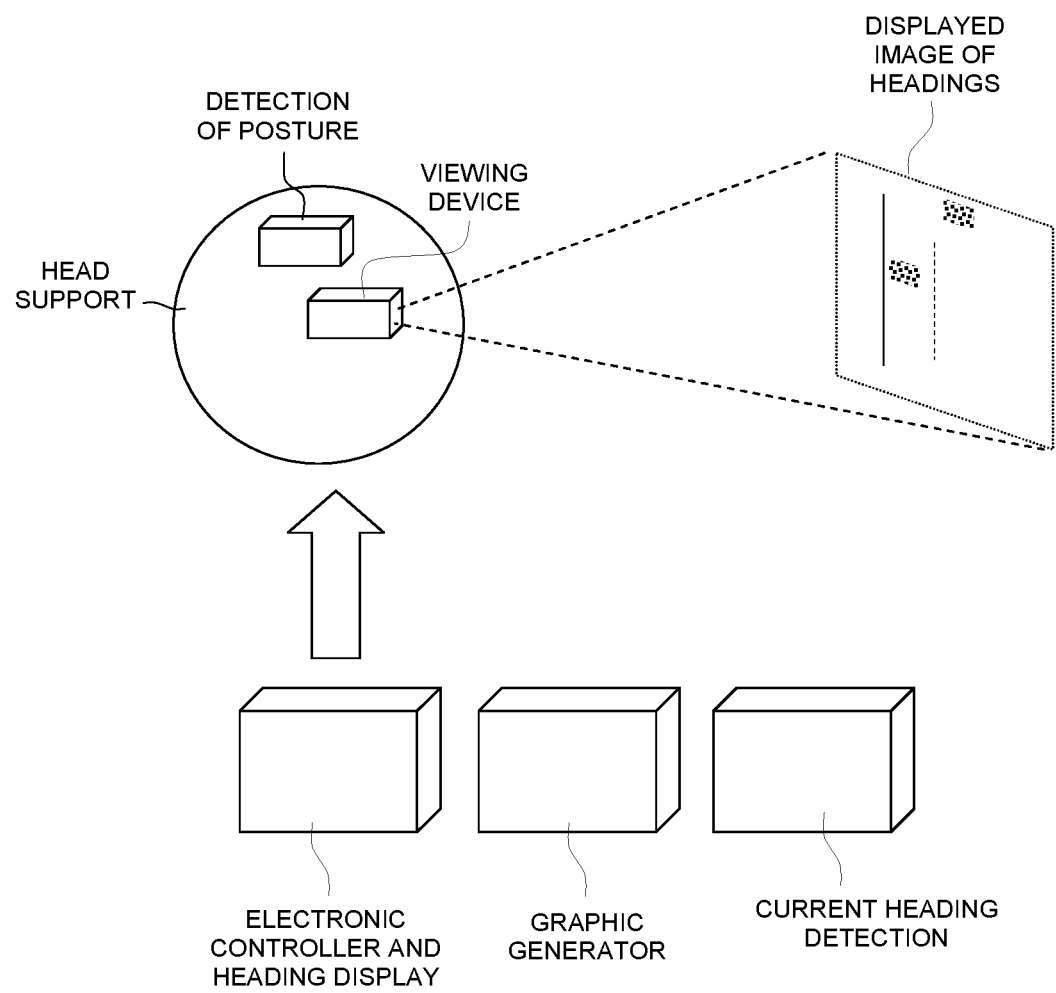
FIG. 5 represents an embodiment of a head viewing system.

FIG. 5 illustrates an embodiment of a head viewing system. The head viewing system according to the invention comprises:

an equipped head support or a helmet comprising an optoelectronic display assembly. This viewing assembly can be monocular or binocular. When the head support or the helmet is worn by a user, this assembly gives a collimated image which arises from a display unit and which is superimposed on the exterior landscape by an optical combiner or mixer;

a system for detecting posture of the head support or of the helmet making it possible to determine the position of the support or of the helmet in the reference frame of the aircraft. Various detection systems exist which are well known to the person skilled in the art. Mention will be made of systems based on magnetic detection in which a receiver measures the components of a known electromagnetic field and systems based on optical detection comprising an emitter and a receiver which is able to determine the position and the orientation of this emitter by shape recognition. The position of the aircraft in a terrestrial reference frame is itself known by means of various sensors such as the aircraft's inertial platform;

an assembly or an electronic computer ensuring the generation of a conformal symbology superimposed on the exterior landscape by the optoelectronic display assembly. This symbology generally comprises the basic information necessary for piloting (indications of the speed, of the altitude, of the attitude, of the horizon, etc.). To ensure this function, the aircraft's various sensors provide the computer with the necessary information. The helmet's orientation detection system gives it the position and orientation information making it possible to display the symbology in a conformal manner, that is to say in a terrestrial reference frame independent of the movements of the aircraft and of the movements of the helmet;

control means, generally one or more control posts making it possible to select, modify or validate the information and the data displayed by the viewing device. These control means can also be disposed on the control stick or be activated by a voice command.

The computer also ensures the specific functions of the invention that are linked to the display of the heading. They are represented in FIGS. 1 to 4 by way of nonlimiting examples. These figures represent in a schematic manner the display of the heading in a helmet viewing device. In these figures, the rectangular outline represents the limits of the field of the viewing device. The landscape P is represented symbolically by ridge lines in these figures. For the sake of clarity, all the symbology having nothing to do with displaying the headings has been deleted from the figures.

Figure 1:
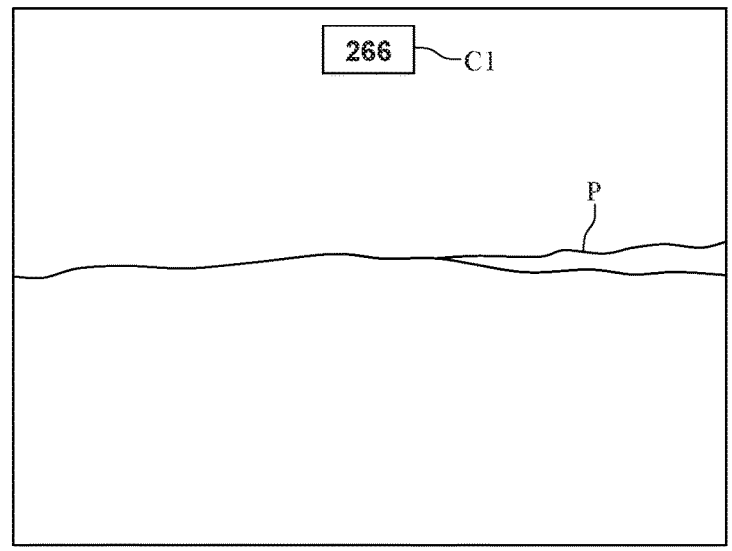
FIGS. 1 to 4 represent the various possible displays of the heading in a head viewing system for aircraft according to the invention.

In FIG. 1, the system displays solely at the center and at the top of the viewing field the current heading C1, that is to say the one actually followed by the aircraft at an instant t. In this FIG. 1, the displayed value of the heading C1 is "266". All the displayed values are in degrees.

Figure 2:
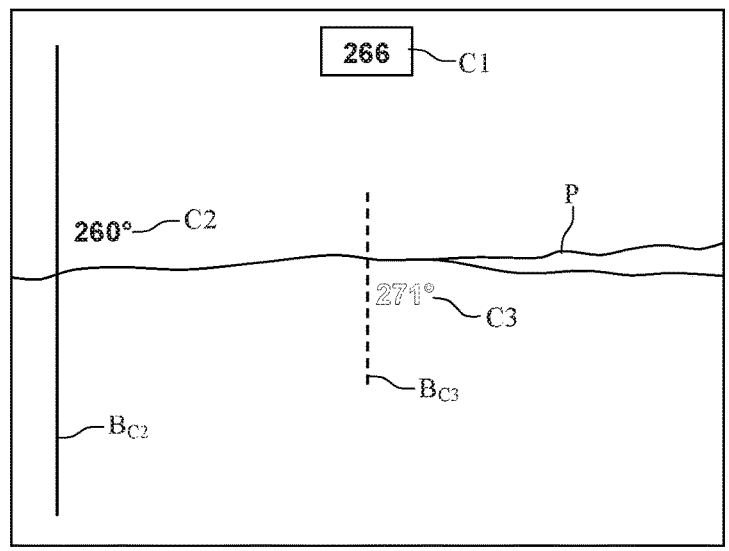

In FIG. 2, the pilot has validated the heading display function according to the invention. The system then displays the setpoint heading C2. In this FIG. 1, the displayed value of the heading C2 is "260". It also displays a third heading C3 termed a "support heading" corresponding to the direction of the head support in a terrestrial reference frame. The value of the heading C3 is given by the information arising from the detection of posture of said head support and the means for detecting the current heading. The displayed value of the heading C3 is "271". The system also displays a first vertical bar $B_{C2}$ whose bearing cuts the exact direction of the setpoint heading C2 and a second vertical bar $B_{C3}$ whose bearing cuts the exact direction of the heading C3. This second bar is, by nature, disposed at the center of the field of the viewing device and remains fixed. These bars are therefore placed in conformal position. They have different graphical representations so as to differentiate them. In the figures, the first bar is represented by a continuous line and the second bar by a dashed line. Of course, it is possible to involve other parameters such as the length, the thickness or the color of the bars.

Figure 3:
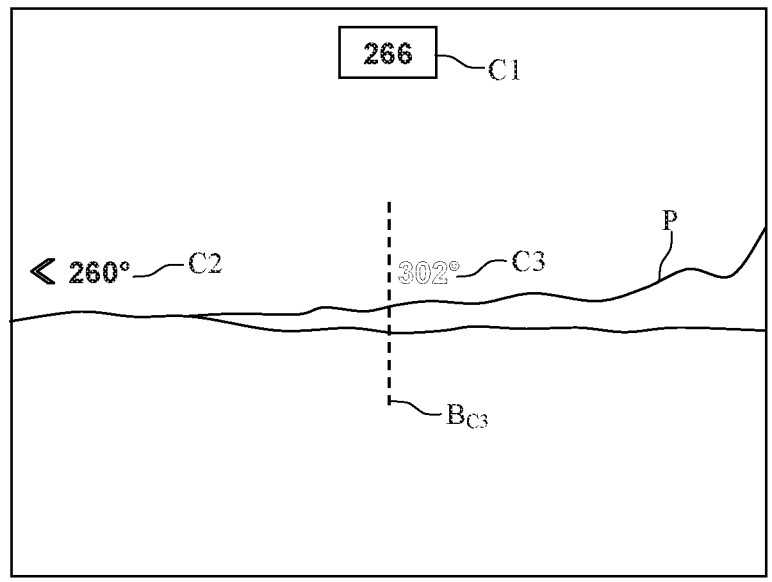

FIG. 3 represents the evolution of the symbology of the headings when the pilot turns his head to designate another direction. The value of the setpoint heading C2 does not change. It remains at the value "260". On the other hand, if this heading exits the visual field, its value remains indicated in the field of the viewing device, but its representation bar $B_{C2}$ which was in conformal position disappears. It is replaced with an icon which indicates that the setpoint heading has exited the visual field. In FIG. 3, by way of example, this icon is a chevron whose tip is pointing in the direction of the setpoint heading. The value of the heading C3 which depends on the posture of the helmet changes. It goes to the value "302", the pilot having turned his head, in this example, by 31 degrees. Of course, the second vertical bar $B_{C3}$ remains fixed in the reference frame of the helmet display.

Figure 4:
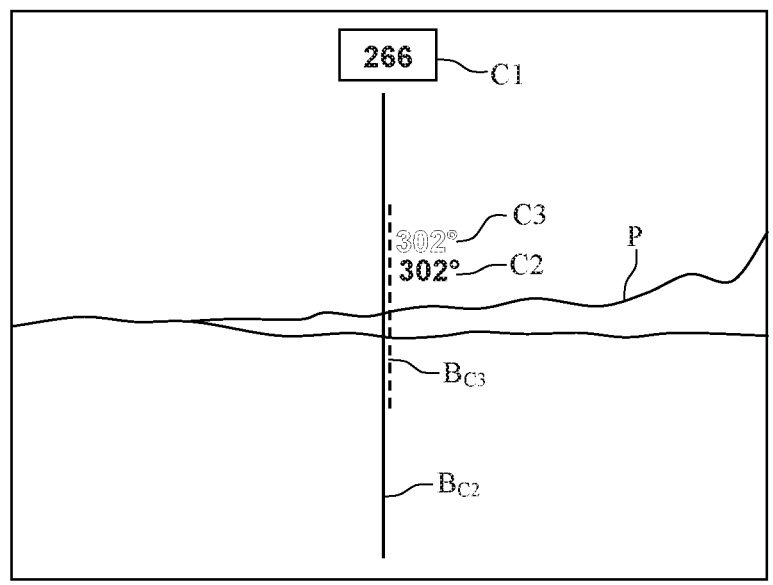

The pilot can, at each instant, validate the direction of the support heading which then becomes the new setpoint heading. Thus, in FIG. 4, the pilot has validated the support heading C3 of FIG. 3 whose value was "302". The new setpoint value C2 therefore now equals "302". At the time of the validation, the two vertical bars $B_{C2}$ and $B_{C3}$, indicating the headings C2 and C3, are merged as seen in FIG. 4.

In the various figures, the value of the current heading C1 has remained unchanged, indicating that the aircraft has not changed direction while the pilot turned his head. When the user validates the new setpoint heading, the heading associated with the direction of their head at the time of the validation is the new heading taken into account by the aircraft's navigation system. If the automatic pilot is engaged, the new heading is that followed by the aircraft, if the automatic piloting is not engaged, the pilot manually follows the new heading indicated in the viewing device.

What is claimed is:

1. A head viewing system for aircraft comprising a head support, a viewing device, a head posture detection system for detection of posture of said head support, aircraft sensors for detecting the current heading of an aircraft and an electronic computer for graphically generating said current heading, wherein the system comprises one or more control posts for controlling, displaying and selecting headings, said system arranged so as:

to display in the viewing device, in response to a first command, a second value in degrees of a second setpoint heading and a third value in degrees of a third heading termed a support heading corresponding to the direction of the head support in a terrestrial reference frame, said direction given by the information arising from the detection of posture of said head support and the aircraft sensors;

to replace, in response to a second command, said second value in degrees of the second heading by said third value in degrees of the third heading, said third heading thus becoming the new heading setpoint.

2. The helmet viewing system as claimed in claim 1, wherein when the current heading, the second heading, and the third heading lie in the viewing field of the viewing device, the display of the value of the heading is carried out in conformal position, that is to say in the exact direction which corresponds to the direction of the heading.

3. The helmet viewing system as claimed in claim 2, wherein when the headings lie outside the viewing field of the viewing device, the display of the value of the heading is carried out at the edge of the field of the viewing device with an icon representative of the direction in which the heading lies.

4. The helmet viewing system as claimed in claim 1, wherein the exact direction of the heading is indicated by a vertical bar, each heading comprising a bar of a different graphic from that of the other heading bars.

5. A method of displaying, managing and selecting the heading in a helmet viewing system for aircraft, said viewing system comprising a head support, a viewing device, a head posture detection system for detection of posture of said head support, aircraft sensors for detecting the current heading of an aircraft and an electronic computer for graphically generating said current heading, wherein the method comprises at least:

an operation of displaying, in response to a first command, a second value in degrees of a second setpoint heading and a third value in degrees of a third heading termed a support heading corresponding to the direction of the head support in a terrestrial reference frame, said direction given by the information arising from the detection of posture of said head support and the aircraft sensors.

6. The method of displaying, managing and selecting the heading as claimed in claim 5, wherein the method comprises:

an operation of substituting, in response to a second command, the second value in degrees of the second heading by the third value in degrees of the third heading, said third heading thus becoming the new heading setpoint.

* * * * *